United States Patent

[11] 3,612,122

| [72] | Inventor | Richard C. Bjork<br>934 Vernal Ave., Mill Valley, Calif. 94941 |
|---|---|---|
| [21] | Appl. No. | 847,926 |
| [22] | Filed | Aug. 6, 1969 |
| [45] | Patented | Oct. 12, 1971 |

[54] EGG OPENER
5 Claims, 6 Drawing Figs.

[52] U.S. Cl. ............................................. 146/2 B, 30/124
[51] Int. Cl. .................................................. A47j 43/14
[50] Field of Search ........................................... 30/123, 124, 366; 146/2, 3, 2 B, 2 P

[56] References Cited
UNITED STATES PATENTS

| 1,924,789 | 8/1933 | Horvath ........................ | 146/2 B |
| 2,798,521 | 7/1957 | Bourque ....................... | 146/2 B |

FOREIGN PATENTS

| 723,443 | 8/1942 | Germany ...................... | 30/124 |
| 734,339 | 7/1955 | Great Britain ................ | 30/124 |
| 943,672 | 5/1956 | Germany ...................... | 30/124 |

Primary Examiner—Robert C. Riordon
Assistant Examiner—J. C. Peters
Attorney—Gordon Wood ABSTRACT: A device for opening an uncooked liquid egg, a soft-boiled egg, or a hard-boiled egg. The egg is placed into a cavity in the egg holder. Then a knife blade is thrust into the shell to start a break. The knife blade is then rotated to force the break open so that the albumen and yolk may be readily removed. A trough is provided on the egg holder to facilitate the pouring out of the albumen and yolk of an uncooked egg. The knife blade is then removed.

INVENTOR
Richard C. Bjork

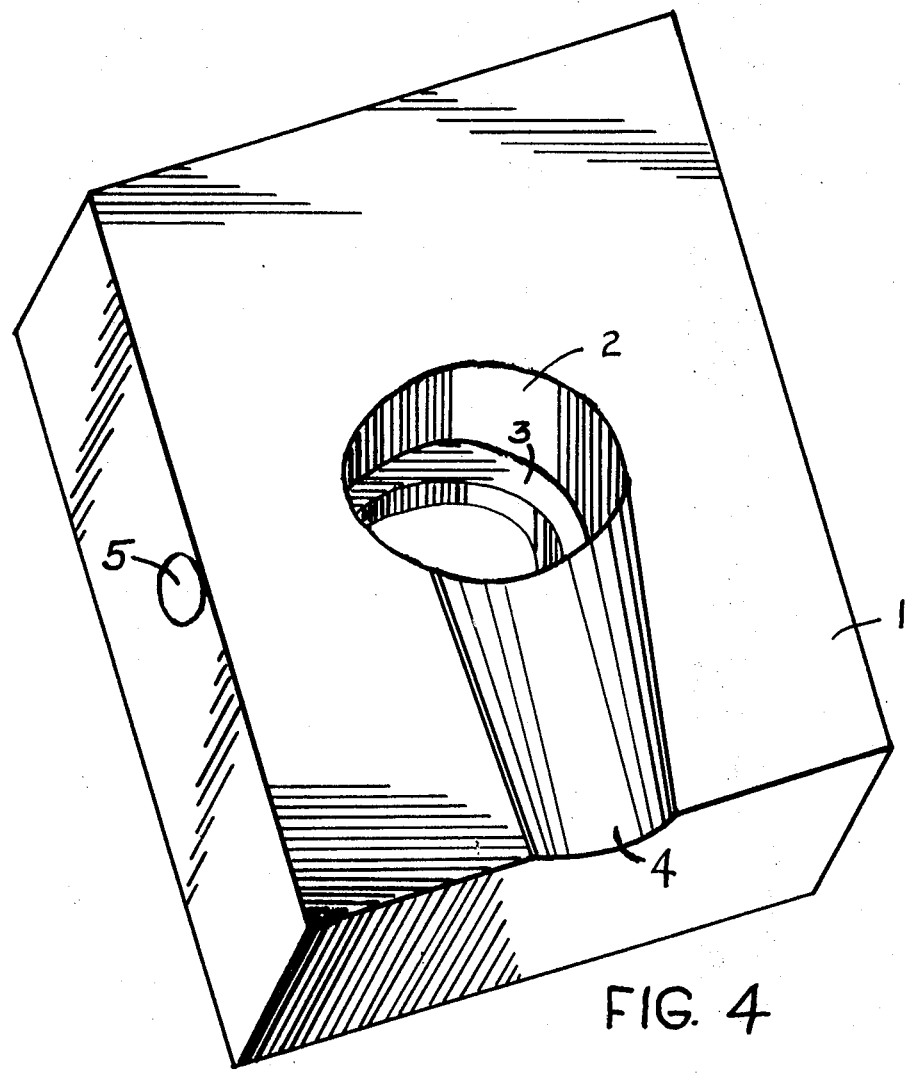
FIG. 4
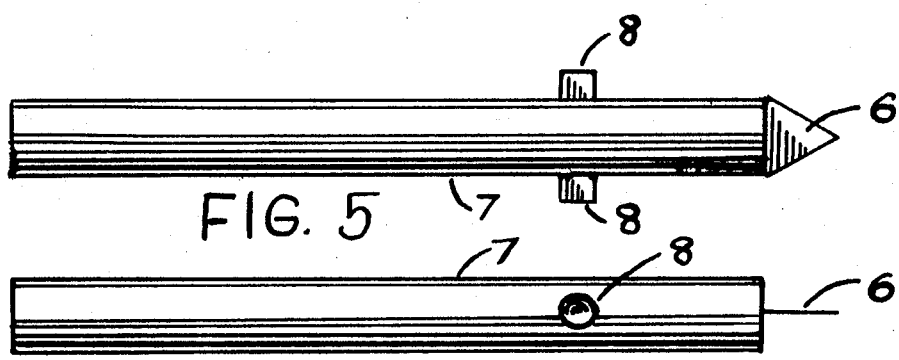
FIG. 5
FIG. 6
INVENTOR
Richard C. Bjork

EGG OPENER

The herein-disclosed invention relates to an egg opener and has for an object to provide an egg opener that can be conveniently operated, whether placed on a table or held in the hand.

Another object of this invention is to provide a penetrating blade that will penetrate and egg with a clean cut and then when rotated, will force the eggshell apart.

Another object of this invention is provide an egg opener that can be used equally advantageously in opening uncooked liquid eggs, soft-boiled eggs, and hard-boiled eggs with less difficulty with broken shells than encountered if the eggs were broken by other means.

Another object of this invention is to provide a trough in the egg opener so that the yolk and albumen of an uncooked, broken egg may be easily poured from the egg opener into a vessel.

In the drawings:

FIG. 4 is a perspective view of the egg opener.

FIG. 5 is a plan view of the knife blade and its handle.

FIG. 6 is a side view of the knife blade and its handle.

Figure 1:
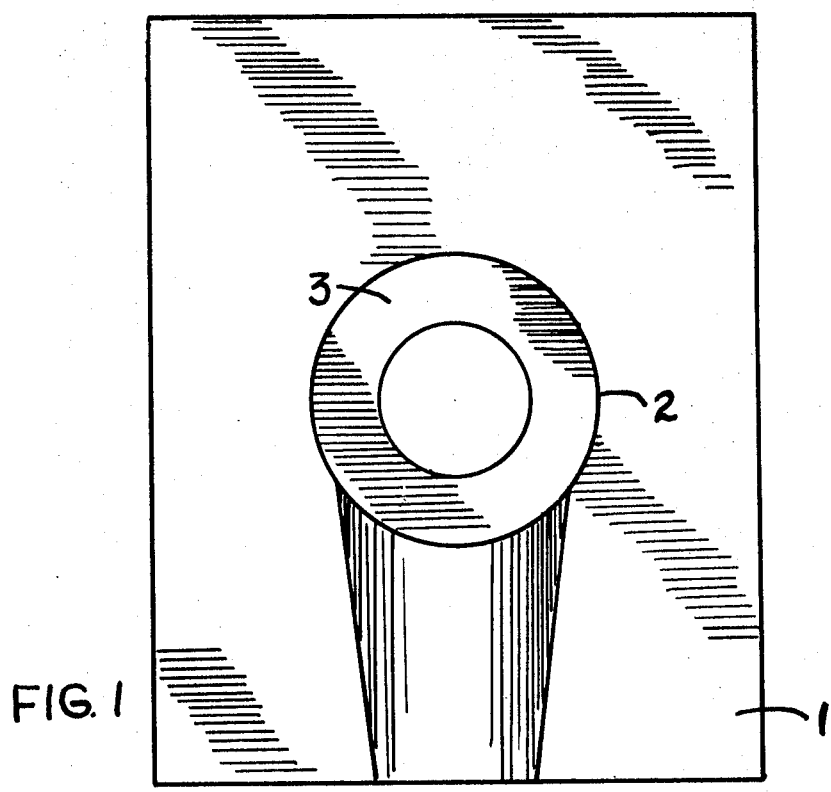
FIG. 1 is a plan view of the egg opener which show the egg cavity and the trough.
Figure 2:
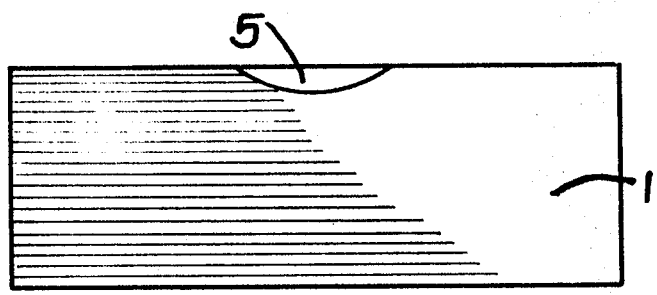
FIG. 2 is an end view of the egg opener which shows the end of the trough.
Figure 3:
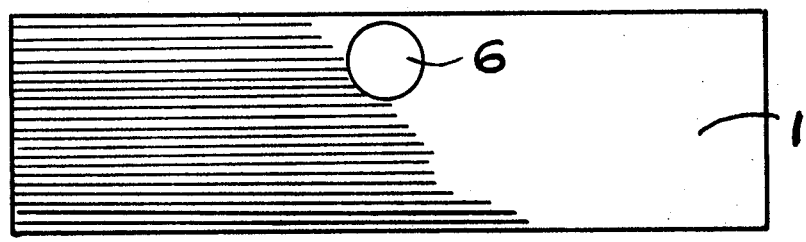
FIG. 3 is a side view of the egg opener which shows the hole the knife blade is thrust into.

The invention consists basically of a holder 1 and a knife blade 6.

An egg is placed in the cavity 2 of the holder 1. The knife blade 6 is thrust through the hole 5 in the holder 1 and penetrates the eggshell to start a break. The knife blade handle 7 is then rotated one quarter of a turn forcing the knife blade 6 to wedge the eggshell open, exposing contents inside the egg. The contents may be readily removed from the egg.

If the egg is uncooked the egg holder 1 may be titled so that the contents will slide of the eggshell, along the trough 4 in the egg holder 1, and into any desirable vessel.

The thrust of the knife blade 6 into the egg is governed by the stops 8 on the knife blade handle 7 hitting the sides of the egg opener 1. The alignment of the stops 8 indicates to the operator the blade position. If he operator is looking down on the egg holder 1 as in the plan view of FIG. 1 the knife blade 6 should show its flat area and the full length of the stops 8 should be visible as in FIG. 5. After maximum penetration into the egg shell the knife blade handle 7 is then rotated one quarter of a turn toward the trough 4 so that only an end view of the stops 8 is visible as in FIG. 6. Then the eggshell will have been wedged apart to the maximum amount possible.

The cavity 2 has a lip 3 on the bottom to hold the egg at the desirable height for penetration by the knife blade 6. The inside diameters of the lip 3 and the cavity 2 are such as to accommodate a variety of shapes and sizes of eggs. A small portion of the egg extends below the cavity lip 3. The egg opener 1 may be operated elevated in the hands or resting on a cooking or eating surface.

The advantages of manifest. The device is simple in construction and can be made of wood, ceramics, plastic, or other materials. Changes in the specific form of the invention, as herein described may be made within the scope of what is claimed without departing from the spirit of the invention.

Having described the invention, what is claimed as new and desired to be protected by Letters Patent is:

1. An egg opener comprising:
   a base formed to provide an egg receptacle,
   a piercing element having a sharp piercing point adapted to pierce the shell of an egg in said receptacle,
   means on said base forming a guide supporting said element for translatory movement along a path of travel coincident with said point into and out of piercing engagement with said shell,
   said last-mentioned means mounting said element to permit rotation of said element about an axis coinciding with said path for separating said shell into two parts.

2. An egg opener according to claim 1 wherein said element is a relatively broad blade provided with a handle supported in said guide.

3. An egg opener according to claim 2 wherein said guide means is a bore in intersecting relation to said receptacle and adapted to receive said blade and handle therein.

4. An egg opener according to claim 3 wherein said base and handle are provided with interengaging stop portions for limiting the movement of said blade toward said egg.

5. An egg opener according to claim 1 wherein said base is formed with an upwardly opening cavity forming said receptacle and a trough extending away from said recess for conveying the albumen of an opened egg away from said receptacle.